A. BALOG.
HEADLIGHT CARRYING MEANS FOR AUTOMOBILES.
APPLICATION FILED NOV. 5, 1918.
1,320,964.
Patented Nov. 4, 1919.
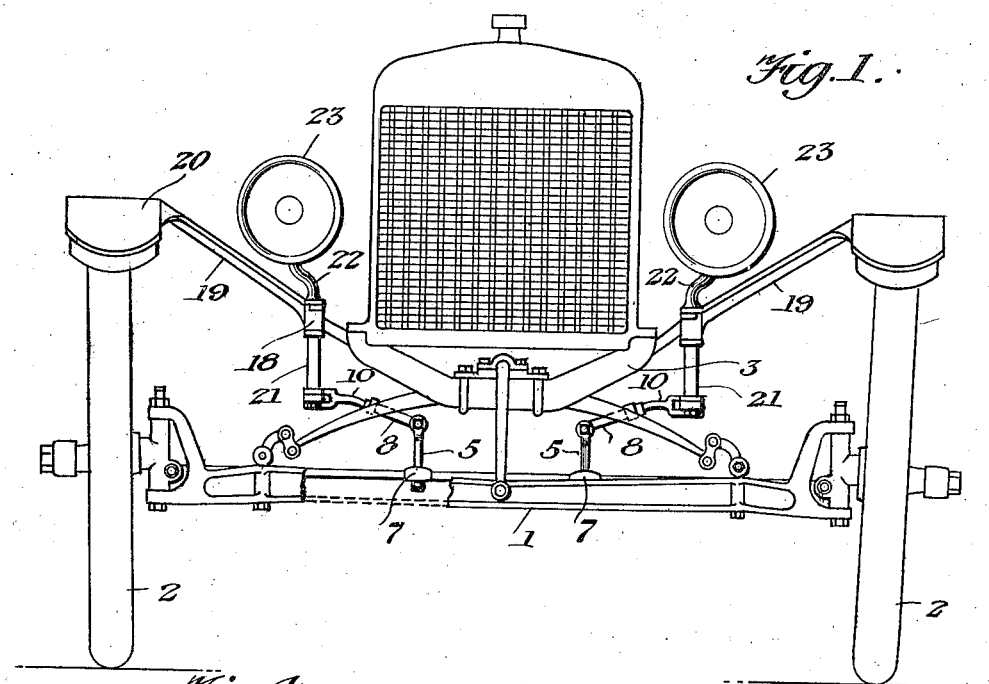
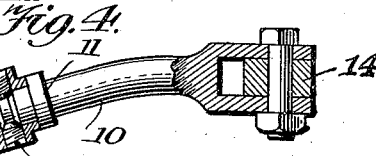
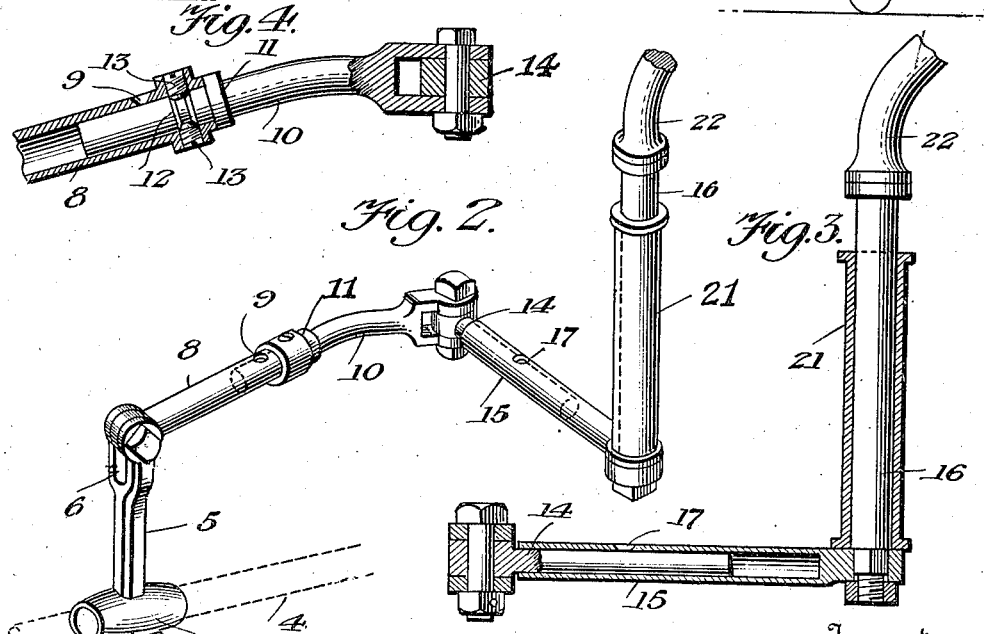
Inventor
Alexander Balog
By Victor J. Evans
Attorney
Witnesses
Geo. Ackman Jr.

UNITED STATES PATENT OFFICE.

ALEXANDER BALOG, OF ELMORA, PENNSYLVANIA.

HEADLIGHT-CARRYING MEANS FOR AUTOMOBILES.

1,320,964.  Specification of Letters Patent.  Patented Nov. 4, 1919.

Application filed November 5, 1918. Serial No. 261,267.

*To all whom it may concern:*

Be it known that I, ALEXANDER BALOG, a citizen of the United States, residing at Elmora, in the county of Cambria and State of Pennsylvania, have invented new and useful Improvements in Headlight-Carrying Means for Automobiles, of which the following is a specification.

My present invention has to do with headlight carrying means for automobiles and more especially Ford automobiles; and it consists in the easily applied, simple and durable headlight carrying means hereinafter described and claimed, whereby the headlights will be turned consonant with the turning of the automobile with a view to directing the beams of light in the direction in which the car is traveling to illuminate the path thereof.

In the accompanying drawings, hereby made a part hereof:

Figure 1 is a front elevation of a Ford automobile equipped with my improved construction.

Fig. 2 is an enlarged perspective showing the connection between the transverse rod of the steering gear and one of the headlights.

Fig. 3 is an enlarged section taken through a portion of the said connection.

Fig. 4 is an enlarged detail section taken through another portion of the connection.

Similar numerals of reference designate corresponding parts in all of the views of the drawings.

The axle 1, the mounting of the wheels 2, the spring supporting of the body 3, and the steering gear of the automobile, may be and preferably are of the ordinary well known construction and need not, therefore, be described in detail.

My invention contemplates the employment on the transverse rod 4 of the steering gear of two uprights 5. Each of these uprights 5 is bifurcated at its upper end as indicated by 6 and is provided at its lower end with a split sleeve 7, equipped with a bolt 28 and nut complementary thereto, whereby the upright may be readily and strongly fixed upon the rod 4. Pivoted in the bifurcations of the uprights 5 are outwardly reaching, vertically swinging tubular arms 8, having oil holes 9, and journaled in the said tubular arms 8 are sections 10, capable of turning about their axes. The said sections 10 are provided with collars 11 that abut against the outer ends of the arms 8 and are also provided with circumferential grooves 12 which receive inwardly extending screws 13, which are carried by the arms 8 and serve to connect the sections 10 strongly in a swiveled manner to said arms 8. At their outer ends the sections 10 are bifurcated for pivotal connection to rearwardly extending male members 14, which are disposed in complementary female members 15 to afford telescopic connections adapted to lend themselves readily to the movements of the spring supported body of the automobile and in that way preclude the imposition of strain upon the connections. At their rear ends the female members 15 are fixed, preferably in the manner shown in Fig. 3, to the lower ends of upright shafts 16. It will also be noticed that the female members 15 are provided with oil holes 17. The upright shafts 16 are journaled in bearings 18, provided on the brackets 19 of the fenders 20, and interposed between the said bearings 18 and the rear portions of the female members 15 are spacing sleeves 21. At their upper ends the shafts 16 are equipped with appropriate means 22 for the connection of headlights 23, which latter *per se* are not of my invention and may, therefore, be of the ordinary well known type or of any other type compatible with the purpose of my invention.

By virtue of my novel construction, as shown and described, and as applied in the manner set forth, it will be manifest that endwise movement of the rod 4 incidental to the turning of the automobile in either direction will be attended by moving of the headlights 23 to cast their beams of light in the same direction. This will be readily understood when it is noted that coincident with endwise movement of the rod 4, the arms 8 and sections 10 will through the medium of the telescopic arms 14—15 on the shafts 16, turn the said shafts about their axes and correspondingly turn the headlights 23. It will also be appreciated that by virtue of my novel construction the vibration or movements of the automobile body will in no way impair the efficiency of my novel connections in transmitting motion from the rod 4 to the headlights 23.

This capacity of function is largely attributable to the ability of the sections 10 to freely turn about their axes in the arms 8, the ability of said arms 8 to swing vertically on the uprights 5, and the ability of the male members 14 to move endwise as well as turn about their axes in the female members 15, which really constitute cranks on the lower ends of the upright shafts 16.

It will be manifest from the foregoing description that my improvement may be readily installed upon old automobiles as well as new automobiles of the Ford type.

The construction herein disclosed constitutes the best practical embodiment of my invention of which I am cognizant, but I do not desire to be understood as confining myself to specific details of construction, since in the future practice of my invention other details of construction may be resorted to, without involving departure from the scope of my invention as defined in my appended claim.

Having described my invention, what I claim and desire to secure by Letters Patent, is:

The combination in an automobile, of a spring-supported body provided with a vertically disposed bearing, a steering gear having a transverse rod, an upright fixed to and movable by the said rod of the steering gear, an upright shaft journaled in and supported by said bearing and equipped with a lamp, a telescopic crank fixed to the lower portion of said shaft, an upright spacing sleeve surrounding the upright shaft and interposed between the vertical bearing and said crank, and a connection intermediate the upright on the steering gear rod and the telescopic crank and mounted to swing vertically on said upright and having two members, one of which is capable of turning about its axis in the other and is held against endwise movement with respect to such other.

In testimony whereof I have affixed my signature.

ALEXANDER BALOG.

Copies of this patent may be obtained for five cents each, by addressing the "Commissioner of Patents, Washington, D. C."